UNITED STATES PATENT OFFICE.

WALTER O. SNELLING, OF ALLENTOWN, PENNSYLVANIA.

FERTILIZING METHOD AND MATERIAL.

1,308,453. Specification of Letters Patent. Patented July 1, 1919.

No Drawing. Original application filed April 17, 1915, Serial No. 22,005. Divided and this application filed July 23, 1918. Serial No. 246,321.

*To all whom it may concern:*

Be it known that I, WALTER O. SNELLING, a citizen of the United States, and resident of Allentown, Lehigh county, Pennsylvania, have invented certain Improvements in Fertilizing Methods and Materials, being a division of application Serial No. 22,005, filed April 17, 1915, of which the following is a specification.

My invention relates to the fertilizing and conditioning of the soils, and it has special reference to the use of explosives for the purpose of distributing fertilizing agents and improving their effects.

One object of my invention is to provide a novel and effective method of treating agricultural soils to improve their physical structure and to increase their store of available plant food.

Another object of my invention is to provide a new and improved class of explosives for agricultural use that shall act to loosen the soil and to simultaneously distribute fertilizing materials therein.

My invention is based upon the principle that a charge of explosive, containing a fertilizer in addition to the ingredients necessary for explosive action, may be fired underground, and will then serve not only to loosen the soil, but also to thoroughly distribute the associated fertilizing material in the loosened earth throughout a considerable radius where it will be available to growing plants.

The use of explosives in agriculture and horticulture is well known, particularly for the purpose of mellowing and softening the soil preparatory to planting fruit trees, and it is found that trees planted in ground that has been broken up by firing charges of dynamite, blasting powder and the like will grow more quickly and develop in a more healthy manner than trees planted in the usual way. Such improved growth of trees and plants in blasted earth is due to the thoroughness with which a properly discharged explosive breaks up the soil particles through a wide radius, which gives the delicate rootlets of the growing plants a better opportunity to spread out through the minute spaces and fissures in the earth and to reach the supplies of plant food set free by the shattering effect of the explosion.

According to my present invention, I greatly increase the beneficial effects of agricultural explosives by adding soil fertilizing ingredients to them, the fertilizers being driven by the explosive action for considerable distances through the loosened earth. I employ an explosive of which one or more of the explosive ingredients has soil fertilizing properties, such as the nitrates, particularly potassium nitrates, ammonium salts or compounds which decompose with evolution of ammonia or ammonium compounds, and of these explosive ingredients I employ an excess, beyond the amount required for explosive action.

I am aware that potassium salts, ammonium salts and nitrates all enter into the normal composition of many explosives, but I believe that I am the first to make use of agricultural explosives containing an excess of such substances, beyond the amounts required for explosive action, for the purpose of fertilizing the soil at the time of explosion. It is further to be noted that the nitrogen present in the nitrates of ordinary explosives is, upon explosion, converted into the form of free nitrogen, and thus is lost as far as any fertilizing effect is concerned. Accordingly, it is only when nitrates are present in excess of the amount required for the normal action of the explosive that there remains sufficient nitrate material, after explosion, to be of any advantage to plant growth.

If, for example, the explosive contains an excess of sodium or potassium nitrate, the excess is not converted upon explosion into free nitrogen, but remains as a fertilizing nitrate. And so also an explosive containing potash as an ingredient may with similar result have said material in excess of that normally required for the explosive action. Ammonium chlorid has been used as an ingredient of explosive mixtures, and such an ammonium salt can be used in excess as a fertilizing ingredient, for while the heat of explosion will tend to dissociate the ammonium salt, the nitrogen content will be rendered assimilable by plants by the formation of nitrates in the soil.

In addition to the excess of explosive ingredient, I may also add a fertilizer inert as far as the explosive reactions are concerned, such for example as calcium phosphate, calcium cyanamid, gypsum, non-oxidizing potassium compounds, or organic products rich in nitrogen, such as guano.

Particles of the explosively inert fertilizer may be contained within the explosive charge, or in a surrounding envelop, and will be driven mechanically by the force of the explosion through the cracks and interstices produced by the explosion, and the liberated gases will also assist in mechanically distributing the particles of fertilizer. As an example of a charge employing fertilizing material in both forms, I have used for orchard purposes, in preparing the soil for planting new trees, or revitalizing old orchards, a finely ground phosphate material mixed with the ordinary ingredients of blasting powder, together with an excess of saltpeter or other nitrate. This mixture is made up in the usual manner in sticks or cartridges which are fired in small holes bored in the soil from one to three feet deep, the charge being well tamped in order that most of the shattering force of the explosion may be generated laterally.

The kinds and amounts of the fertilizers to be used will be governed by the requirements of the plants or trees to be planted, and the chemical composition and structure of the soil.

It is obvious that my invention is capable of a wide variety of modifications, both in the materials used and in the methods of employing them, and it is therefore to be understood that my invention is not restricted to the specific substances and methods set forth above, and that it is limited only by the scope of the appended claims.

I claim:

1. An explosive containing an explosive ingredient having soil fertilizing properties, the said ingredient being present in a greater amount than is required for explosive action.

2. An explosive for agricultural use containing a nitrogenous explosive ingredient in excess of the amount normally required for explosive action.

WALTER O. SNELLING.

Copies of this patent may be obtained for five cents each, by addressing the "Commissioner of Patents, Washington, D. C."